United States Patent
Gretz

(10) Patent No.: US 6,511,028 B1
(45) Date of Patent: Jan. 28, 2003

(54) ONE-PIECE CONNECTOR FOR ELONGATED OBJECT HOLDER

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 09/999,459

(22) Filed: Nov. 23, 2001

(51) Int. Cl.[7] .................................................. F16L 3/00
(52) U.S. Cl. ...................... 248/222.52; 248/58; 248/72; 248/68.1; 248/73
(58) Field of Search ............................... 248/222.52, 61, 248/67.7, 65, 73, 72, 58; 24/291, 292; 52/716.6; 411/324, 336, 335, 301

(56) References Cited

U.S. PATENT DOCUMENTS

| | | | | | |
|---|---|---|---|---|---|
| 2,531,352 | A | * | 11/1950 | Churchill | 24/291 |
| 3,242,690 | A | * | 3/1966 | Kettell | 24/370 |
| 3,461,637 | A | * | 8/1969 | Jansson | 24/291 |
| 3,493,025 | A | * | 2/1970 | LaLonde et al. | 411/103 |
| 3,599,693 | A | * | 8/1971 | Bucheli | 411/108 |
| 4,285,379 | A | * | 8/1981 | Kowalski | 411/85 |
| 4,410,298 | A | * | 10/1983 | Kowalski | 411/104 |
| 4,542,871 | A | * | 9/1985 | Fortsch | 248/68.1 |
| 4,545,697 | A | * | 10/1985 | Verdenne et al. | 403/106 |
| 4,645,393 | A | * | 2/1987 | Pletcher | 403/388 |
| 4,662,590 | A | * | 5/1987 | Hungerford, Jr. | 248/72 |
| 4,950,099 | A | * | 8/1990 | Roellin | 403/348 |
| 5,133,523 | A | * | 7/1992 | Daigle et al. | 248/62 |
| 5,209,619 | A | * | 5/1993 | Rinderer | 411/553 |
| 5,271,586 | A | * | 12/1993 | Schmidt | 248/58 |
| 5,375,798 | A | * | 12/1994 | Hungerford, Jr. | 248/58 |
| 5,624,217 | A | * | 4/1997 | Hungerford, Jr. | 248/72 |
| 5,704,571 | A | * | 1/1998 | Vargo | 248/58 |
| 6,290,426 | B1 | * | 9/2001 | van Gijsel et al. | 403/247 |

* cited by examiner

*Primary Examiner*—Korie Chan
*Assistant Examiner*—Ingrid Weinhold

(57) ABSTRACT

This invention is a connector for connecting holders for cable, pipe and other elongated objects to the overhead in buildings and other structures. The connector is a one-piece device molded of plastic. The base section fits into overhead equipment struts while the support section interfaces with the holder. The base has slots in it which ease its installation in the equipment strut. V-shaped legs connecting the support and base ease installation and help prevent the holder from loosening from the connector.

3 Claims, 2 Drawing Sheets

ONE-PIECE CONNECTOR FOR ELONGATED OBJECT HOLDER

BACKGROUND OF THE INVENTION

Field of the Invention

This invention is in the field of devices for suspending elongated objects from the overhead in buildings and other structures, particularly devices that connect the holder for the elongated object with the overhead structure.

BRIEF SUMARY OF THE INVENTION

It is common in the building industry to suspend or support pipe, cable and other elongated objects from the walls and overhead. Also common is to suspend or support from the walls and overhead structure special members to which the elongated objects are attached. These special members may take the form of channel sections referred to as equipment struts. On the open side of the channel the strut has opposing lips to which various devices may be attached. The invention is a one-piece connector that connects the cable holder to the strut. It consists of two generally rectangular, planar sections—a base section and a support section—joined by V-shaped legs. The connector is attached to the strut by inserting the base section into the strut so it is captured by the strut lips. The base section has a threaded hole for engaging a fastener. The support section contacts the cable holder. The cable holder is bottomed on the support section and fastened to the connector by a screw passing through a central opening in the support section. The screw is threaded into the base section until the base section and the support section both firmly engage the strut lips, the V-shaped legs flexing in the process to allow firm engagement. In some instances the base section may be integrated with the cable or pipe holder.

DETAILED DESCRIPTION OF THE INVENTION

The invention is a connector for use in suspending pipe, cable and other elongated objects from the walls and overhead in buildings and other structures. For the sake of simplicity the elongated objects will be referred to as 'cable' herein but it is to be understood this term encompasses any type of generally elongated object such as conduit or pipe which may be suspended or supported in a structure.

Figure 1:
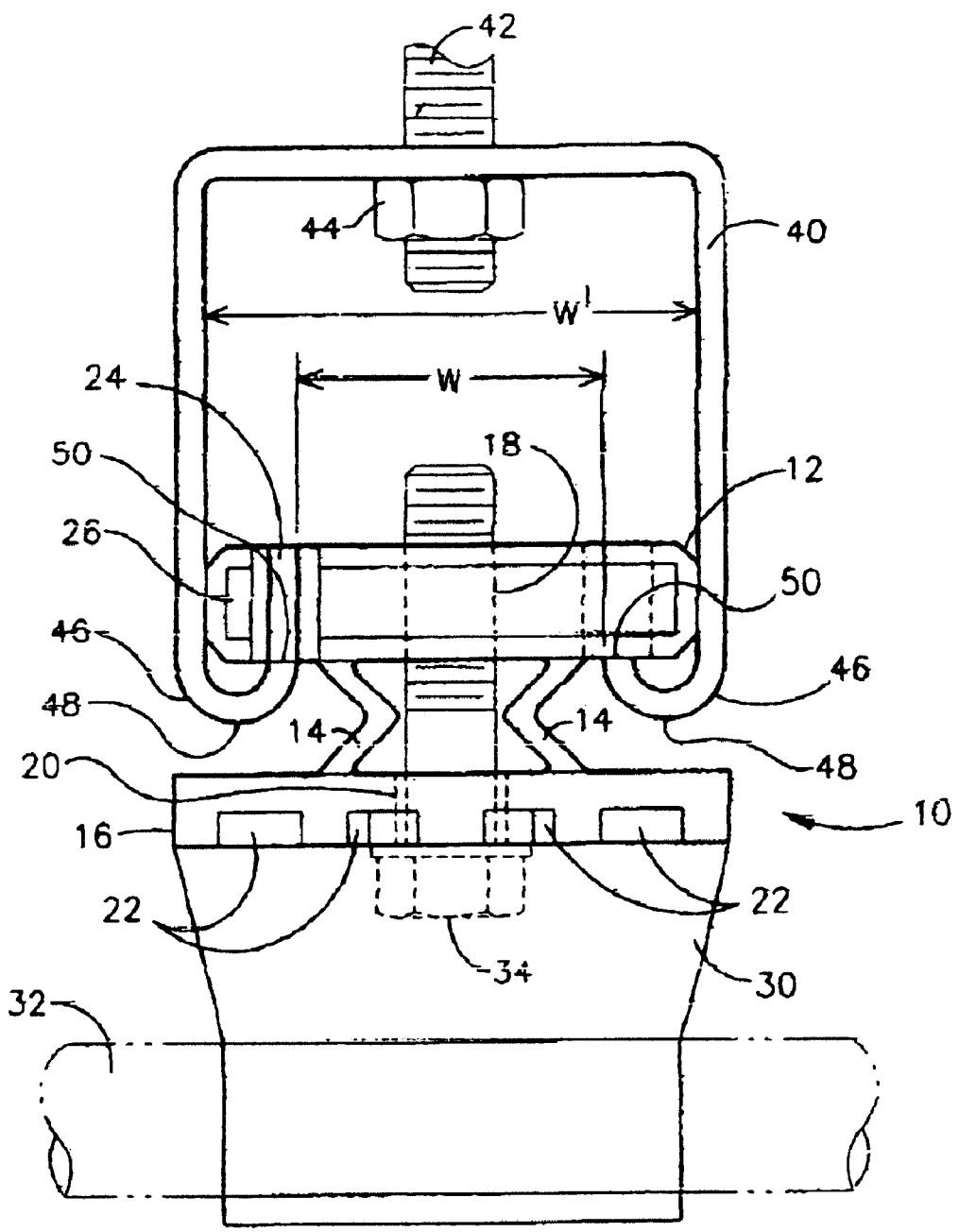
FIG. 1 is a front elevation of the invention in place in a strut, showing its relationship to the equipment strut and to the cable holder.

In the art to which the invention pertains it is common to suspend or support channel-shaped members which are referred to as equipment struts. The struts serve as a common support for any type of objects which are to be installed. Each type and size of object has its own holder which is adapted in turn to attach to the common strut. FIG. 1 shows such an installation. The equipment strut 40 has strut lips 46, which have tops 48 and ends 50. The distance between the ends 50 and tops 48 of the strut lips 46 will be referred to as the strut height. The width W across the strut lips 46 will be referred to as the lip width. The connector 10 of the invention connects the cable holder 30 to the equipment strut 40. Cable holder 30 carries cable 32, which is shown in phantom for clarity.

The strut 10 of the invention comprises a rectangular base 12 and a rectangular support 16, both connected as one piece by connector legs 14. The base 12 and support 16 both have central openings 18 and 20, respectively. The opening 18 is threaded while the opening 18 is clear.

The strut 40 is attached to a structure by any means such as threaded rod 42 and nut 44. The strut lips 46 support the base 12. The cable holder 30 is attached to the connector 10 by means of fastener 34 threaded into the opening 18 in the base 12.

Note that while cable 32 is shown with its axis generally perpendicular to that of the strut 40 it could be oriented at virtually any angle to the strut 40. Also note that the cable holder 30 would ordinarily be fastened to the connector 10 before the cable 32 is installed in the holder 30; also the cable holder 30 may be integrated with the connector 10. Note further that the support 16 is not in contact with the strut lips 46 and fastener 34 is not screwed down; these points will be taken up later.

Figure 2:
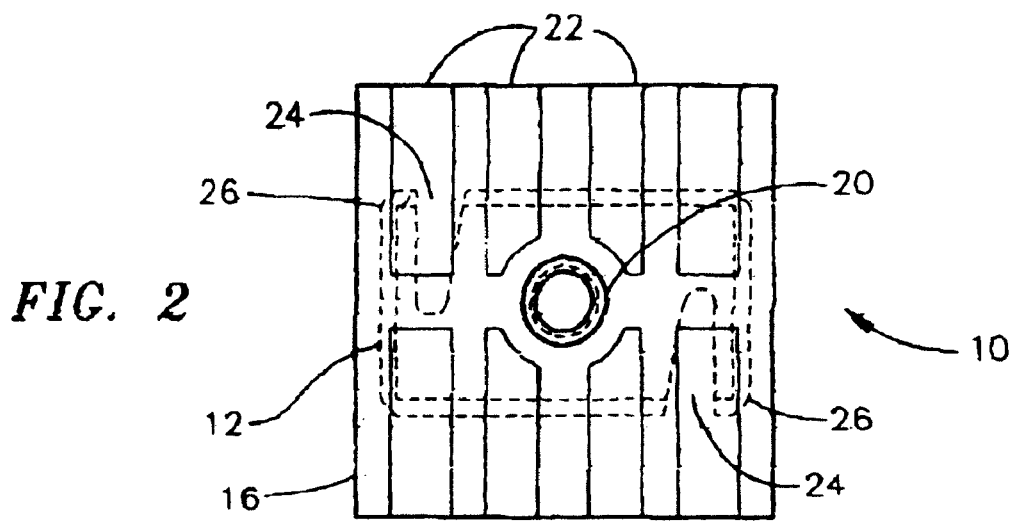
FIG. 2 is a plan view of the connector of the invention from the support side.

Referring to FIG. 2, which shows the best mode contemplated for the invention, the support section 16 of connector 10 is generally square and planar and about as large on a side as the width of strut 40. Its thickness is about a fifth of the length of a side. The central opening 20 is clear, as previously noted. Grooves 22 help provide a low-slip surface and also lighten the piece and save material.

The base section 12 of the connector 10 is generally rectangular. As seen especially in FIG. 3 the length of the shorter side is about equal to the lip width of the strut; see FIG. 1. The length of the longer side is approximately equal to the inside width W' of the strut 40. The central hole 18 is threaded to receive the fastener 34. Slots 24 are formed in the long sides of the base 12, one at each end on opposite sides, leaving spring legs 26, whose purpose will be explained later. The depth of the slot 24 is about half the width of the base 12. The width of the slot 24 at its outer end is anywhere from 10–20%, preferably approximately 15% of the length of the base 12. The outer edge of the slot 24 is essentially parallel to the short side of the base 12 and a distance in from the short side of the base 12 about 10% of the length of the long side of the base 12. This latter distance is thus the width of the spring leg 26, its length being about half the width of the base 12, as noted above. The inner edge of the slot 24 is at an angle approximately 10° from the perpendicular to the long edge of the base 12.

Figure 3:
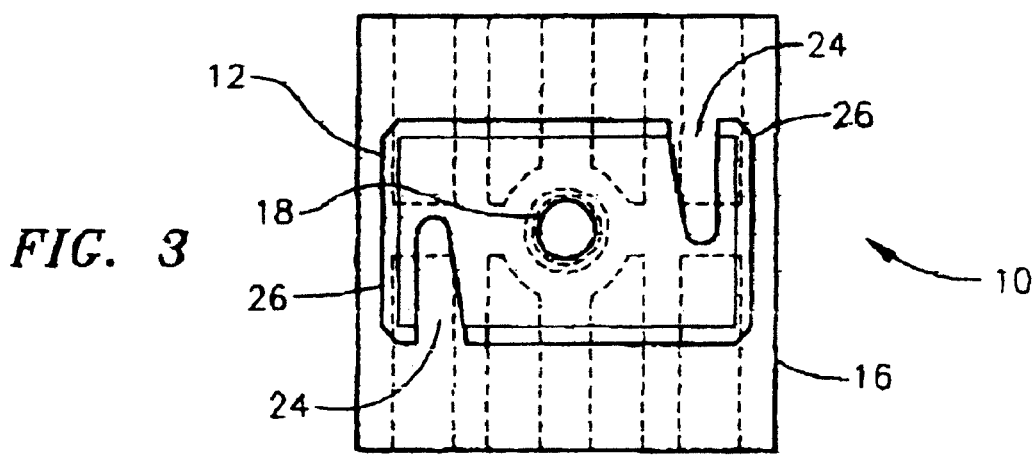
FIG. 3 is a plan view of the connector from the base side.
Figure 4:
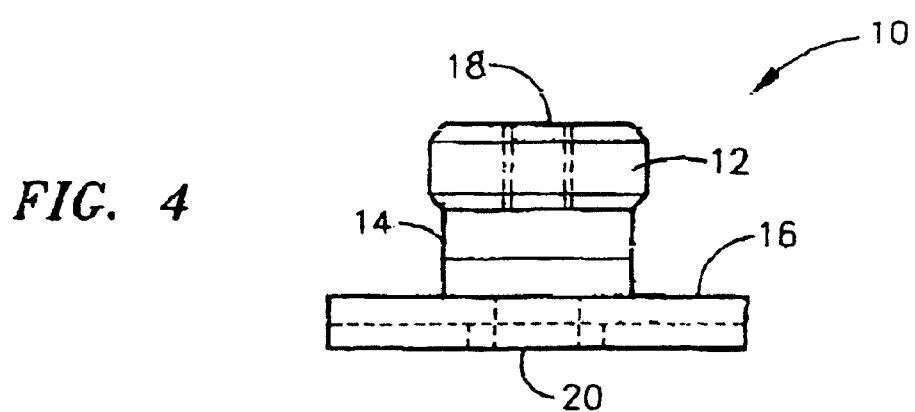
FIG. 4 is a side elevation of the connector.

FIG. 4 shows connector 10 in a side elevation. The connector legs 14 are visible in this view and in FIG. 1 but note that they are not shown in phantom in FIGS. 2 and 3 for the sake of clarity.

The material of the connector 10 is a suitable plastic such as nylon.

The method of using the invention is as follows: With the strut 40 in an overhead position, the base 12 of connector 10 is inserted into the strut with the long axis of the base 12 parallel to the long axis of the strut. Gripping support 16, the connector 10 is then rotated 90° counterclockwise until it is in the position shown in FIG. 1. With the slots 24 oriented as shown in FIGS. 2 and 3, counterclockwise rotation is necessary in order that the spring legs 26 lead in the rotation and flex into the slot 24 to facilitate this step. With the connector fully rotated the spring legs 26 flex back to their static position to help hold the connector 10 in its operative position.

At this point the cable holder 30 is abutted to the support 16 and the fastener 34 is screwed into base 12. Fastener 34 is then screwed in farther than its position in FIG. 1 until the inner surface of the support 16 contacts the tops 48 of the strut lips 46 and the inner surface of the base 12 contacts the ends 50 of the strut lips 46. The V-shaped connector legs 14 flex inwardly to allow this movement. The fastener 34 may then be screwed in slightly more until the strut lips 46 are captured sufficiently firmly between the base 12 and the support 16 to hold both the connector 10 and cable holder 30 against rotation or axial movement in the strut. The configuration of the connector legs 14 is also such that the apices of the connector legs firmly contact the fastener 34 to help lock the fastener in place and prevent its loosening. The cable 32 may then be installed in cable holder 30.

While the foregoing is in terms of suspending the cable 32 from the overhead, the same procedure would be used for supporting the cable 32 from a wall. Also, if the cable holder were integrated with the connector 10, fastener 34 and the steps involving it would not be used; the base part 12 of such an integrated unit would be inserted into the strut 40 and rotated into operative position. The cable 32 would then be loaded in the holder part of the unit just as in the foregoing procedure for the separate connector 10 and holder 30.

The advantages of the invention are that the connector 10 is of one-piece plastic construction. Thus, it may be easily molded. The slots 24 and the consequent spring legs 26 make one-hand installation very easy and sure. The V-shaped connector legs 14 allow simple, sure and rigid positioning of the cable holder 30, or any other device that may be used with the connector 10.

What is claimed is:

1. A one-piece connector for connecting a holder for elongated objects to an equipment strut, comprising:

a rectangular base having long sides and short sides, said base including a long axis bisecting said short sides, and a central threaded opening therein;

a support adapted for attachment to a holder for elongated objects, said support including a clear central opening therein;

flexible V-shaped connector legs integral with and joining said rectangular base to said support;

said support integrally joined to said base by said legs in such a manner that said base is coplanar to said support, said clear central opening of said support is coaxial with said threaded opening in said base, and said V-shaped legs include apices facing said central openings of said base and said support;

a slot in each of said long sides of said base, said slots at opposite ends of said long sides, said slots extending inwards of said long sides about half the length of said short sides, said slots having outer and inner edges; and integral spring legs formed by the portion of said base remaining between said outer edge of said slot and the outer edge of said short side.

2. The method of using the one-piece connector for connecting a holder for elongated objects to an equipment strut of the type having a long axis, a short axis, and strut lips having ends and tops, comprising:

providing a one-piece connector including a rectangular-shaped base having a long axis bisecting the short sides of said base and a central threaded opening therein;

providing a support integrally joined to said base by flexible V-shaped legs in such a manner that said base is coplanar to said support, said support includes a clear central opening coaxial with said threaded opening in said base, and said V-shaped legs include apices facing said central openings of said base and said support;

installing said one-piece connector in said strut by inserting said base into said strut with said long axis of said base parallel to said long axis of said strut;

turning said connector through 90° into its operative position in said strut;

providing spring legs on said base for easing the turning of said base and acting to hold said base in its operative position;

providing a holder for elongated objects and a fastener for connecting said holder to said base, said fastener including threads on one end and a head on the opposite end; and installing said holder by inserting said fastener through said clear opening in said support, advancing said fastener until said threaded end contacts said threaded opening in said base; and screwing said threaded end of said fastener into said threaded opening in said base until said base and said coplanar integral support firmly engage said ends and said tops, respectively, of said strut lips and reversibly flex said V-shaped legs thereby securing said base and said support in place between said base and said coplanar support and pinning said fastener between said apices of said V-shaped legs to prevent loosening of said fastener.

3. A combination of an equipment strut and a one-piece connector for connecting a holder for elongated objects to the strut, comprising:

an equipment strut including
      a planar support leg;
      an integral strut at each end of said support leg, said struts at a right angle to said support leg;
      strut lips including a 180° angle bend at the end of each strut, said strut lips extending inward of said struts;
      strut lip ends, said ends including a straight extension of said strut lips parallel to said struts; and a one-piece connector including
      a rectangular base having long sides and short sides, said base including a long axis bisecting said short sides, and a central threaded opening therein;
      a support adapted for attachment to a holder for elongated objects, said support including a clear central opening therein;
      flexible V-shaped connector legs integral with and joining said rectangular base to said support;
      said support integrally joined to said base by said legs in such a manner that said base is coplanar to said support, said clear central opening of said support is coaxial with said threaded opening in said base, and said V-shaped legs include apices facing said central openings of said base and said support;
      a slot in each of said long sides of said base, said slots at opposite ends of said long sides, said slots extending inwards of said long sides about half the length of said short sides, said slots having outer and inner edges; and
      integral spring legs formed by the portion of said base remaining between said outer edge of said slot and the outer edge of said short side.

* * * * *